United States Patent
Brothers et al.

(10) Patent No.: US 7,213,647 B2
(45) Date of Patent: *May 8, 2007

(54) METHODS OF SEALING EXPANDABLE PIPE IN WELL BORES AND SEALING COMPOSITIONS

(75) Inventors: Lance E. Brothers, Chickasha, OK (US); Anthony V. Palmer, Ardmore, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 320 days.

This patent is subject to a terminal disclaimer.

(21) Appl. No.: 10/789,554

(22) Filed: Feb. 27, 2004

(65) Prior Publication Data

US 2004/0167248 A1 Aug. 26, 2004

Related U.S. Application Data

(63) Continuation of application No. 10/177,568, filed on Jun. 21, 2002, now Pat. No. 6,722,433.

(51) Int. Cl.
*E21B 43/10* (2006.01)
(52) U.S. Cl. .................. 166/288; 166/207; 166/293
(58) Field of Classification Search ............. 166/288, 166/207, 293
See application file for complete search history.

(56) References Cited

U.S. PATENT DOCUMENTS

| | | | | |
|---|---|---|---|---|
| 4,340,427 A * | 7/1982 | Sutton | ................ | 106/641 |
| 5,293,938 A | 3/1994 | Onan et al. | ................ | 166/293 |
| 5,588,488 A | 12/1996 | Vijn et al. | ................ | 166/293 |
| 5,688,844 A | 11/1997 | Chatterji et al. | ................ | 524/8 |
| 5,695,008 A | 12/1997 | Bertet et al. | ................ | 166/187 |
| 5,718,288 A | 2/1998 | Bertet et al. | ................ | 166/287 |
| 5,791,380 A | 8/1998 | Onan et al. | ................ | 138/149 |
| 5,795,924 A | 8/1998 | Chatterji et al. | ................ | 523/130 |
| 5,820,670 A | 10/1998 | Chatterji et al. | ................ | 106/727 |
| 5,897,699 A | 4/1999 | Chatterji et al. | ................ | 106/678 |
| 5,945,387 A | 8/1999 | Chatterji et al. | ................ | 507/224 |
| 6,063,738 A | 5/2000 | Chatterji et al. | ................ | 507/269 |
| 6,070,671 A | 6/2000 | Cumming et al. | ................ | 166/381 |
| 6,258,757 B1 | 7/2001 | Sweatman et al. | ................ | 507/219 |
| 6,271,181 B1 | 8/2001 | Chatterji et al. | ................ | 507/219 |
| 6,322,109 B1 | 11/2001 | Campbell et al. | ................ | 285/92 |
| 6,328,106 B1 | 12/2001 | Griffith et al. | ................ | 166/295 |
| 6,401,817 B1 | 6/2002 | Griffith et al. | ................ | 166/295 |
| 6,431,282 B1 | 8/2002 | Bosma et al. | ................ | 166/288 |
| 6,508,305 B1 | 1/2003 | Brannon et al. | ................ | 166/293 |
| 6,543,522 B1 | 4/2003 | Hegde | ................ | 165/80.3 |
| 6,557,640 B1 * | 5/2003 | Cook et al. | ................ | 166/380 |
| 6,575,240 B1 | 6/2003 | Cook et al. | ................ | 166/207 |
| 6,598,677 B1 | 7/2003 | Baugh et al. | ................ | 166/285 |
| 6,668,928 B2 | 12/2003 | Brothers | ................ | 166/292 |
| 2003/0116319 A1 | 6/2003 | Brothers | ................ | 166/287 |

FOREIGN PATENT DOCUMENTS

| | | |
|---|---|---|
| EP | EO 0 460 744 B1 | 7/1997 |
| EP | 0 980 957 A1 | 2/2000 |
| FR | 2 799 458 | 10/1999 |
| GB | 2 288 393 A | 10/1995 |
| WO | WO 03/048514 A1 | 6/2003 |

OTHER PUBLICATIONS

Halliburton brochure entitled "Stabilizer 434B Latex Stabilizer" dated 1999.
Halliburton brochure entitled "Latex 2000 Cement Additive" dated 1998.
Halliburton brochure entitled "Hi-Dense® Weight Additives" dated 1998.
Abstract No. JP 60 96,559 entitled "Binder Compositions Having Deformability After Hardening," Japan Synthetic Rubber Co.

* cited by examiner

*Primary Examiner*—Frank Tsay
(74) *Attorney, Agent, or Firm*—Craig W. Roddy; Baker Botts L.L.P.

(57) ABSTRACT

The present invention provides methods and compressible foamed sealing compositions for sealing expandable pipe in well bores. The compressible sealant compositions for sealing expandable pipe are basically comprised of a hydraulic cement, a rubber latex, a rubber latex stabilizer, a gas and a mixture of foaming and foam stabilizing surfactants.

108 Claims, No Drawings

METHODS OF SEALING EXPANDABLE PIPE IN WELL BORES AND SEALING COMPOSITIONS

CROSS-REFERENCE TO RELATED APPLICATION

This application is a Continuation of Application Ser. No. 10/177,568, filed Jun. 21, 2002, now U.S. Pat. No. 6,722,433, the entire disclosure of which is incorporated herein by reference.

BACKGROUND OF THE INVENTION

1. Field of the Invention

The present invention relates to methods and compressible sealant compositions for sealing expandable pipe in well bores.

2. Description of the Prior Art

A new well completion practice has been developed whereby casings and liners are expanded diametrically after they are placed in well bores. Prior to the expansion, a sealing composition is placed in the annulus between the walls of the well bore and the unexpanded casing or liner. A problem which can be encountered involves the use of hydraulic cement compositions as the sealing composition. Hydraulic cement compositions are non-compressible and tend to resists the expansion of the casing or liner making the expansion more difficult. In addition, if the cement composition gels or sets prior to when the expansion is accomplished, the cement composition is crushed in the annular space between the walls of the well bore and the expandable casing or liner whereby it does not function to seal the expanded casing or liner in the well bore.

Thus, there are needs for improved sealant compositions for sealing expandable casings or liners in well bores which are compressible and maintain the properties required to provide a seal between the walls of the well bore and the expanded casings or liners.

SUMMARY OF THE INVENTION

The present invention provides methods of sealing expandable casings and liners in well bores and compressible sealant compositions. A method of the present invention for sealing an expandable pipe or pipe string such as a casing or liner in a well bore is basically comprised of the following steps. The expandable pipe or pipe string is placed in the well bore. A compressible hydraulic cement sealant composition which remains competent when compressed is placed in the annulus between the well bore and the pipe or pipe string. The sealant composition is allowed to harden into an impermeable mass and thereafter, the expandable pipe or pipe string is expanded whereby the hardened sealant composition is compressed.

Another method of the invention for sealing expandable pipe or pipe strings is basically comprised of the following steps. A compressible foamed sealant composition is provided comprised of a hydraulic cement, a rubber latex, a rubber latex stabilizer, a gas and a mixture of foaming and foam stabilizing surfactants. An expandable pipe or pipe string is placed in the well bore and the compressible foamed sealant composition is placed in the annulus between the well bore and the expandable pipe or pipe string. The foamed sealant composition is allowed to harden into an impermeable mass, and thereafter, the expandable pipe or pipe string is expanded whereby the hardened foamed sealant composition is compressed.

The compressible foamed sealant compositions of this invention which remain competent when compressed are basically comprised of a hydraulic cement, a rubber latex, a rubber latex stabilizer, a gas and a mixture of foaming and foam stabilizing surfactants.

The amount of gas included in the compressible foamed sealant composition is such that the gas volume is substantially equal to the expansion volume of the expandable casings or liners. This allows the hardened sealant composition to be compressed while maintaining its integrity and sealant properties.

The objects, features and advantages of the present invention will be readily apparent to those skilled in the art upon a reading of the description of preferred embodiments which follows.

DESCRIPTION OF PREFERRED EMBODIMENTS

The present invention provides compressible hydraulic cement sealant compositions which remain competent when compressed. That is, when a compressible hydraulic cement composition of this invention is used for sealing an expandable pipe or pipe string in a well bore, the composition is placed in the annulus between the expandable pipe and the well bore, it is allowed to harden therein and when the expandable pipe is expanded, the sealant composition is compressed and retains its competency, i.e., continues to support and seal the pipe. Methods of using the compositions are also provided.

The compressible sealant compositions of this invention are basically comprised of a hydraulic cement, a rubber latex, a rubber latex stabilizer, a gas and a mixture of foaming and foam stabilizing surfactants. The compressible foamed sealant compositions are compressible after hardening to the extent that the compositions contain gas. Thus, the volume of gas utilized in the sealant compositions are substantially equal to the volume reduction of the annular space containing the sealant composition.

Examples of the hydraulic cement that can be utilized in accordance with this invention, include, but are not limited to, calcium aluminate cement, Portland cement, and Portland blast furnace cement. Of these, calcium aluminate cement is preferred.

A variety of well known rubber latexes can be utilized in accordance with the present invention such as styrene/butadiene copolymer latex emulsion, polychloroprene emulsion, polyisoprene emulsion and acrylonitrilibutadiene emulsion. Of these, styrene/butadiene latex emulsion is preferred. The styrene/butadiene latex emulsion can include in the range of from about 40% to about 70% water by weight of the latex. The weight ratio of styrene to butadiene in the latex can range from about 10%:90% to about 90%:10%. A preferred styrene/butadiene aqueous latex for use in accordance with the present invention contains water in an amount of about 50% by weight of the latex and has a weight ratio of styrene to butadiene in the latex of about 25%:75%. A latex of this type is commercially available from Halliburton Energy Services, Inc. of Duncan, Okla. under the trade designation "LATEX 2000™." The rubber latex utilized is included in the foamed sealant composition of this invention in an amount in the range of from about 80% to about 300% by weight of the calcium aluminate cement therein.

In order to prevent the aqueous latex from prematurely coagulating and increasing the viscosity of the foamed sealant composition, an effective amount of a latex stabilizing surfactant is included in the composition. Latex stabilizing surfactants which are suitable for use in accordance with this invention are surfactants having the formula R-Ph-O(OCH$_2$CH$_2$)$_m$OH wherein R is an alkyl group having from about 5 to about 30 carbon atoms, Ph is phenyl and m is an integer of from about 5 to about 50. A preferred surfactant in the above defined group is ethoxylated nonylphenyl containing in the range of from about 20 to about 30 moles of ethylene oxide.

Another suitable surfactant is a salt having the formula R$_1$(R$_2$O)$_n$SO$_3$X wherein R$_1$ is an alkyl group having from about 5 to about 20 carbon atoms, R$_2$ is the group —CH$_2$—CH$_2$—, n is an integer from about 10 to about 40 and X is a cation. A particularly preferred surfactant of this type is the sodium salt of a sulfonated compound derived by reacting a C$_{12-15}$ alcohol with about 15 moles of ethylene oxide having the formula H(CH$_2$)$_{12-15}$(CH$_2$CH$_2$O)$_{15}$SO$_3$Na which is commercially available under the trade designation name "AVANEL S150™" from PPG Mazer, Mazer Chemicals, a Division of PPG Industries, Inc. of Gurnee, Ill.

The latex stabilizing surfactant utilized is included in the foamed sealant composition in an amount in the range of from about 3% to about 6% by weight of the rubber latex in the foamed sealant composition, preferably in an amount of 4%.

The gas in the compressible foamed sealant composition can be air or nitrogen with nitrogen being preferred. The gas is present in the foamed sealant composition in an amount in the range of from about 5% to about 35% by volume of the non-foamed sealant composition. As mentioned above, the volume of gas used in the foamed sealant composition is generally substantially equal to the volume of decrease in the annulus between the walls of the well bore and the expandable pipe when the expandable pipe is expanded.

Various mixtures of foaming and foam stabilizing surfactants can be utilized in the compressible foamed sealant compositions of this invention. One such mixture is comprised of about 2 parts by weight of an alpha-olefinic sulfonate surfactant having the formula H(CH$_2$)$_n$—CH═CH—(CH$_2$)$_m$SO$_3$Na wherein n and m are individually integers in the range of from about 6 to about 16 and about 1 part by weight of a betaine surfactant having the formula R—CONHCH$_2$CH$_2$CH$_2$N$^+$(CH$_3$)$_2$CH$_2$CO$_2^-$ wherein R is a radical selected from the group of decyl, cetyl, oleyl, lauryl and cocoyl. This mixture is described in detail in U.S. Pat. No. 5,897,699 issued to Chatterji et al. on Apr. 27, 1999 which is incorporated herein by reference thereto.

Another particularly preferred mixture of foaming and foam stabilizing surfactants is comprised of about 63.3 parts by weight of an ethoxylated alcohol ether sulfate surfactant of the formula H(CH$_2$)a(OC$_2$H$_4$)$_b$OSO$_3$NH$_4^+$ wherein a is an integer in the range of from about 6 to about 10 and b is an integer in the range of from about 3 to about 10, 31.7 parts by weight of an alkyl or alkene amidopropyl betaine surfactant having the formula R—CONHCH$_2$CH$_2$CH$_2$N$^+$(CH$_3$)$_2$CH$_2$CO$_2^-$ wherein R is a radical selected from the group of decyl, cocoyl, lauryl, cetyl and oleyl and about 5 parts by weight of an alkyl or alkene amidopropyl dimethyl amine oxide surfactant having the formula R—CONHCH$_2$CH$_2$CH$_2$N$^+$(CH$_3$)$_2$O$^-$ wherein R is a radical selected from the group of decyl, cocoyl, lauryl, cetyl and oleyl. This mixture is described in detail in U.S. Pat. No. 6,063,738 issued to Chatterji et al. on May 16, 2000 which is incorporated herein by reference thereto.

Of the above mixtures of foaming and foam stabilizing surfactants, a mixture of an ethoxylated alcohol ether sulfate surfactant, an alkyl or alkene amidopropyl betaine surfactant and an alkyl or alkene amidopropyl dimethyl amine oxide surfactant is preferred.

The mixture of foaming and foam stabilizing surfactants is included in the compressible foamed sealant composition of this invention in an amount in the range of from about 4% to about 10% by volume of the rubber latex therein, preferably in an amount of about 6%.

The compressible foamed sealant composition can also include a viscosity increasing agent for suspending particulate solids therein. A variety of viscosity increasing agents also known as gelling agents can be utilized including, but not limited to, bentonite, hydroxyethylcellulose, sodium silicate and guar gum. Of these, bentonite is preferred.

When used, the viscosity increasing agent is included in the compressible foamed sealant composition in an amount in the range of from about 5% to about 10% by weight of cement therein, preferably in an amount of 7%.

The compressible foamed sealant composition can also include a particulate solid density adjusting weighting material suspended therein. A variety of weighting materials can be utilized including, but not limited to, iron oxide, barium sulfate, galena and manganese oxide. Of these, iron oxide is preferred.

When used, the density adjusting weighting material is included in the compressible foamed sealant composition in an amount in the range of from about 1% to about 250% by weight of cement therein.

The compressible foamed sealant composition can also include a set retarder. Examples of set retarders which can be used include, but are not limited to, citric acid, sodium gluconate, gluconic acid, sodium citrate and sugar. Of these, citric acid is preferred.

When used, the set retarder is included in the compressible foamed sealant composition in an amount in the range of from about 0.2% to about 4% by weight of cement therein, preferably in an amount of about 1%.

As is well known to those skilled in the art, a variety of other conventional additives can be utilized in the compressible foamed sealant composition of this invention including, but not limited to, fluid loss control additives, accelerators, dispersants and lost circulation materials.

A method of the present invention for sealing an expandable pipe or pipe string such as a casing or liner in a well bore is basically comprised of the following steps. The expandable pipe or pipe string is placed in the well bore. A compressible hydraulic cement sealant composition which remains competent when compressed is placed in the annulus between the well bore and the expandable pipe or pipe string. The sealant composition is allowed to harden into an impermeable mass and thereafter, the expandable pipe or pipe string is expanded whereby the hardened sealant composition is compressed.

Another method of this invention for sealing an expandable pipe or pipe string in a well bore is basically comprised of the following steps. A compressible sealant composition is provided comprised of a hydraulic cement, a rubber latex, a rubber latex stabilizer, a gas and a mixture of foaming and foam stabilizing surfactants. An expandable pipe or pipe string is placed in the well bore. The compressible foamed sealant composition is then placed in the annulus between the well bore and the expandable pipe or pipe string and the foamed sealant composition is allowed to harden into an impermeable mass therein. Thereafter, the expandable pipe or pipe string is expanded whereby the hardened foamed sealant composition is compressed.

The hydraulic cement, rubber latex, rubber latex stabilizer and mixture of foaming and foam stabilizing surfactants are as described above and are included in the compressible foamed sealant composition in the amounts set forth above. The gas is also as described above and is included in the compressible foamed sealant composition in the general amount set forth above. However, as also mentioned above, the gas used is included in the compressible foamed sealant composition in a volume amount which is substantially the same as the volume decrease in the annulus between the walls of the well bore and the expandable pipe when the expandable pipe is expanded. The expansion of the expandable pipe compresses the gas in the foamed sealant composition but the composition maintains its competency, i.e., its integrity and sealing properties, whereby it prevents the undesirable migration of fluids between zones or formations penetrated by the well bore and physically supports and positions the pipe in the well bore.

A preferred compressible foamed sealant composition for sealing an expandable pipe or pipe string in a well bore is comprised of: a hydraulic cement; a rubber latex; a rubber latex stabilizer; a gas; and a mixture of foaming and foam stabilizing surfactants.

As mentioned, the compressible foamed sealant composition when required also includes a viscosity increasing agent, a density adjusting weighting material, a cement retarder and other conventional additives.

A preferred method of this invention for sealing an expandable pipe or pipe string in a well bore is comprised of the steps of: (a) providing a compressible foamed sealant composition comprised of a hydraulic cement; a rubber latex, a rubber latex stabilizer, a gas and a mixture of foaming and foam stabilizing surfactants; (b) placing the expandable pipe or pipe string in the well bore; (c) placing the compressible foamed sealant composition in the annulus between the well bore and the expandable pipe or pipe string; (d) allowing the foamed sealant composition to harden into an impermeable mass; and (e) expanding the expandable pipe or pipe string whereby the hardened foamed sealant composition is compressed.

Another preferred method of this invention for sealing an expandable pipe or pipe string in a well bore is comprised of the steps of: (a) providing a compressible foamed sealant composition comprised of calcium aluminate cement, a rubber latex comprised of a styrene/butadiene copolymer latex emulsion containing water in an amount of about 50% by weight of the latex and being present in the foamed sealant composition in an amount in the range of from about 80% to about 300% by weight of the calcium aluminate cement therein, a rubber latex stabilizer comprised of a surfactant having the formula $H(CH_2)_{12-15}(CH_2CH_2O)_{15}SO_3Na$ present in the foamed sealant composition in an amount in the range of from about 3% to about 6% by weight of the rubber latex therein, nitrogen gas present in the foamed sealant composition in an amount in the range of from about 5% to about 35% by volume of the non-foamed sealant composition and a mixture of foaming and foam stabilizing surfactants comprised of a mixture of about 63.3 parts by weight of an ethoxylated alcohol ether sulfate surfactant, about 31.7 parts by weight of a cocoyl amidopropyl betaine surfactant and about 5 parts by weight of a cocoyl amidopropyl dimethyl amine oxide surfactant present in the foamed sealant composition in an amount in the range of from about 4% to about 10% by volume of the rubber latex therein; (b) placing the expandable pipe or pipe string in the well bore; (c) placing the compressible foamed sealant composition in the annulus between the well bore and the expandable pipe or pipe string; (d) allowing the foamed sealant composition to harden into an impermeable mass; and (e) expanding the expandable pipe or pipe string whereby the hardened foamed sealant composition is compressed.

As mentioned above, the foamed sealant composition can further comprise bentonite present in the foamed sealant composition in an amount in the range of from about 5% to about 10% by weight of cement therein, an iron oxide weighting material present in the foamed sealant composition in an amount in the range of from about 1% to about 250% by weight of cement therein and a citric acid cement set retarder present in the foamed sealant composition in an amount of about 1% by weight of cement therein.

In order to further illustrate the compressible foamed sealant compositions and methods of this invention, the following example is given.

EXAMPLE

A compressible foamed sealant composition of this invention was prepared by first mixing calcium aluminate cement with a rubber latex comprised of a styrene/butadiene copolymer latex emulsion containing water in an amount of about 50% by weight of the latex present in the resulting slurry in an amount of about 221% by weight of the cement therein, a rubber latex stabilizer comprised of a surfactant having the formula $H(CH_2)_{12-15}(CH_2CH_2O)_{15}SO_3Na$ was added to the slurry in an amount of about 4% by weight of the rubber latex therein, a mixture of foaming and foam stabilizing surfactants comprised of about 63.3 parts by weight of an ethoxylated alcohol ether sulfate surfactant, about 31.7 parts by weight of a cocoyl amidopropyl betaine surfactant and about 5 parts by weight of a cocoyl amidopropyl dimethyl amine oxide surfactant was added to the slurry in an amount of about 6% by volume of the rubber latex in the slurry, bentonite was added to the slurry in an amount of about 7% by weight of cement in the slurry, particulate solid iron oxide was added to the slurry in an amount of about 200% by weight of cement in the slurry and a citric acid set retarder was added to the slurry in an amount of 1% by weight of cement in the slurry. The resulting slurry density was 14.45 pounds per gallon. The slurry was foamed so that 23.9% of air was entrained in the foamed slurry. The foamed slurry had a density of 11 pounds per gallon. The thickening time of the foamed slurry was 3 hours and 22 minutes at 91° F. After being allowed to harden for 24 hours in a closed container in a 110° F. water bath, the foamed cement slurry was compressed by 25% by the application of 1,425 psi to a piston located on top of the closed container. When the sample was then removed from the container it was tested for compressive strength which was 120 psi. A foamed Portland cement mixture was tested under the same conditions and in the same way as described above for the compressible foamed sealant composition of this invention. The Portland cement was crushed during the volume reduction of the experiment.

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A method of sealing an expandable pipe or pipe string in a well bore comprising:
    placing a foamed compressible hydraulic cement composition in an annulus between the well bore and the expandable pipe or pipe string; and
    expanding the expandable pipe or pipe string whereby the compressible composition is compressed.

2. The method of claim 1 wherein the compressible composition remains competent when compressed.

3. The method of claim 1 wherein the compressible hydraulic cement composition comprises a hydraulic cement, a rubber latex, a rubber latex stabilizer, a gas, and a mixture of foaming and foam stabilizing surfactants.

4. The method of claim 1 wherein the compressible hydraulic cement composition comprises at least one from the following group: a calcium aluminate cement, a Portland cement, and a Portland blast furnace cement.

5. The method of claim 1 wherein the compressible hydraulic cement composition comprises calcium aluminate cement.

6. The method of claim 3 wherein the rubber latex comprises at least one from the following group: a styrene/butadiene copolymer latex emulsion, a polychloroprene emulsion, a polyisoprene emulsion, and an acrylonitrilibutadiene emulsion.

7. The method of claim 3 wherein the rubber latex is a styrene/butadiene copolymer latex emulsion containing water in an amount in the range of from about 40% to about 70% by weight of the latex.

8. The method of claim 3 wherein the rubber latex is present in the composition in an amount in the range of from about 80% to about 300% by weight of cement therein.

9. The method of claim 3 wherein the rubber latex stabilizer comprises a surfactant having the formula R-Ph-O(OCH$_2$CH$_2$)$_m$OH wherein R is an alkyl group having from about 5 to about 30 carbon atoms, Ph is phenyl and m is an integer of from about 5 to about 50, or a surfactant having the formula R$_1$(R$_2$O)$_n$SO$_3$X wherein R1 is an alkyl group having from about 5 to about 20 carbon atoms, R$_2$ is the group —CH$_2$—CH$_2$—, n is an integer from about 10 to about 40 and X is a cation.

10. The method of claim 3 wherein the rubber latex stabilizer is a surfactant having the formula H(CH$_2$)$_{12-15}$(CH$_2$CH$_2$O)$_{15}$SO$_3$Na.

11. The method of claim 3 wherein the rubber latex stabilizer is present in the composition in an amount in the range of from about 3% to about 6% by weight of rubber latex therein.

12. The method of claim 3 wherein the gas comprises at least one from the following group: air and nitrogen.

13. The method of claim 3 wherein the gas is nitrogen.

14. The method of claim 3 wherein the gas is present in the composition in an amount in the range of from about 5% to about 35% by volume of the non-foamed composition.

15. The method of claim 3 wherein the mixture of foaming and foam stabilizing surfactants is a mixture of an ethoxylated alcohol ether sulfate surfactant, an alkyl or alkene amidopropyl betaine surfactant, and an alkyl or alkene amidopropyl dimethyl amine oxide surfactant.

16. The method of claim 3 wherein the mixture of foaming and foam stabilizing surfactants is present in the composition in an amount in the range of from about 4% to about 10% by volume of rubber latex therein.

17. The method of claim 3 wherein the composition further comprises a viscosity increasing agent.

18. The method of claim 17 wherein the viscosity increasing agent comprises at least one from the following group: bentonite, hydroxyethyl cellulose, sodium silicate, and guar gum.

19. The method of claim 17 wherein the viscosity increasing agent is bentonite.

20. The method of claim 17 wherein the viscosity increasing agent is present in the composition in an amount in the range of from about 5% to about 10% by weight of cement therein.

21. The method of claim 3 wherein the composition further comprises a density adjusting weighting material.

22. The method of claim 21 wherein the density adjusting weighting material comprises at least one from the following group: a particulate iron oxide, barium sulfate, galena, and manganese oxide.

23. The method of claim 21 wherein the density adjusting weighting material is particulate iron oxide.

24. The method of claim 21 wherein the density adjusting weighting material is present in the composition in an amount in the range of from about 1% to about 250% by weight of cement therein.

25. The method of claim 3 wherein the composition further comprises a cement set retarder.

26. The method of claim 25 wherein the set retarder comprises at least one from the following group: citric acid, sodium gluconate, gluconic acid, sodium citrate, and a sugar.

27. The method of claim 25 wherein the set retarder is citric acid.

28. The method of claim 25 wherein the set retarder is present in the composition in an amount in the range of from about 0.2% to about 4% by weight of cement therein.

29. A method of sealing an expandable pipe or pipe string in a well bore comprising:
    placing a compressible composition in an annulus between the well bore and the expandable pipe or pipe string;
    allowing the composition to harden; and
    expanding the expandable pipe or pipe string whereby the hardened composition is compressed.

30. The method of claim 29 wherein the compressible composition remains competent when compressed.

31. The method of claim 29 wherein the compressible composition is foamed.

32. The method of claim 29 wherein the compressible composition is a compressible hydraulic cement composition.

33. The method of claim 32 wherein the compressible hydraulic cement composition comprises a hydraulic cement, a rubber latex, a rubber latex stabilizer, a gas, and a mixture of foaming and foam stabilizing surfactants.

34. The method of claim 32 wherein the compressible hydraulic cement composition comprises at least one from the following group: a calcium aluminate cement, a Portland cement, and a Portland blast furnace cement.

35. The method of claim 32 wherein the compressible hydraulic cement composition comprises calcium aluminate cement.

36. The method of claim 33 wherein the rubber latex comprises at least one from the following group: a styrene/butadiene copolymer latex emulsion, a polychloroprene emulsion, a polyisoprene emulsion, and an acrylonitrilibutadiene emulsion.

37. The method of claim 33 wherein the rubber latex is a styrene/butadiene copolymer latex emulsion containing water in an amount in the range of from about 40% to about 70% by weight of latex.

38. The method of claim 33 wherein the rubber latex is present in the composition in an amount in the range of from about 80% to about 300% by weight of cement therein.

39. The method of claim 33 wherein the rubber latex stabilizer comprises a surfactant having the formula R-Ph-O(OCH$_2$CH$_2$)$_m$OH wherein R is an alkyl group having from about 5 to about 30 carbon atoms, Ph is phenyl and m is an integer of from about 5 to about 50, or a surfactant having the formula R$_1$(R$_2$O)$_n$SO$_3$X wherein R$_1$ is an alkyl group having from about 5 to about 20 carbon atoms, R$_2$ is the group —CH$_2$—CH$_2$—, n is an integer from about 10 to about 40 and X is a cation.

40. The method of claim 33 wherein the rubber latex stabilizer is a surfactant having the formula H(CH$_2$)$_{12\text{-}15}$(CH$_2$CH$_2$O)$_{15}$SO$_3$Na.

41. The method of claim 33 wherein the rubber latex stabilizer is present in the composition in an amount in the range of from about 3% to about 6% by weight of rubber latex therein.

42. The method of claim 33 wherein the gas comprises at least one from the following group: air and nitrogen.

43. The method of claim 33 wherein the gas is nitrogen.

44. The method of claim 33 wherein the gas is present in the composition in an amount in the range of from about 5% to about 35% by volume of the non-foamed composition.

45. The method of claim 33 wherein the mixture of foaming and foam stabilizing surfactants is a mixture of an ethoxylated alcohol ether sulfate surfactant, an alkyl or alkene amidopropyl betaine surfactant, and an alkyl or alkene amidopropyl dimethyl amine oxide surfactant.

46. The method of claim 33 wherein the mixture of foaming and foam stabilizing surfactants is present in the composition in an amount in the range of from about 4% to about 10% by volume of rubber latex therein.

47. The method of claim 33 wherein the composition further comprises a viscosity increasing agent.

48. The method of claim 47 wherein the viscosity increasing agent comprises at least one from the following group: bentonite, hydroxyethyl cellulose, sodium silicate, and guar gum.

49. The method of claim 47 wherein the viscosity increasing agent is bentonite.

50. The method of claim 47 wherein the viscosity increasing agent is present in the composition in an amount in the range of from about 5% to about 10% by weight of cement therein.

51. The method of claim 33 wherein the composition further comprises a density adjusting weighting material.

52. The method of claim 51 wherein the density adjusting weighting material comprises at least one from the following group: a particulate iron oxide, barium sulfate, galena, and manganese oxide.

53. The method of claim 51 wherein the density adjusting weighting material is particulate iron oxide.

54. The method of claim 51 wherein the density adjusting weighting material is present in the composition in an amount in the range of from about 1% to about 250% by weight of cement therein.

55. The method of claim 33 wherein the composition further comprises a cement set retarder.

56. The method of claim 55 wherein the set retarder comprises at least one from the following group: citric acid, sodium gluconate, gluconic acid, sodium citrate, and a sugar.

57. The method of claim 55 wherein the set retarder is citric acid.

58. The method of claim 55 wherein the set retarder is present in the composition in an amount in the range of from about 0.2% to about 4% by weight of cement therein.

59. A method of sealing an expandable pipe or pipe string in a well bore comprising:
  placing a compressible hydraulic cement composition which remains competent when compressed in an annulus between the well bore and the expandable pipe or pipe string;
  allowing the composition to harden; and
  expanding the expandable pipe or pipe string whereby the hardened composition is compressed.

60. The method of claim 59 wherein the compressible hydraulic cement composition comprises at least one from the following group: a calcium aluminate cement, a Portland cement, and a Portland blast furnace cement.

61. The method of claim 59 wherein the compressible hydraulic cement composition comprises calcium aluminate cement.

62. The method of claim 59 wherein the compressible hydraulic cement composition is foamed.

63. The method of claim 59 wherein the compressible hydraulic cement composition comprises a hydraulic cement, a rubber latex, a rubber latex stabilizer, a gas, and a mixture of foaming and foam stabilizing surfactants.

64. The method of claim 63 wherein the rubber latex comprises at least one from the following group: a styrene/butadiene copolymer latex emulsion, a polychloroprene emulsion, a polyisoprene emulsion, and an acrylonitrilibutadiene emulsion.

65. The method of claim 63 wherein the rubber latex is a styrene/butadiene copolymer latex emulsion containing water in an amount in the range of from about 40% to about 70% by weight of the latex.

66. The method of claim 63 wherein the rubber latex is present in the composition in an amount in the range of from about 80% to about 300% by weight of cement therein.

67. The method of claim 63 wherein the rubber latex stabilizer comprises a surfactant having the formula R-Ph-O(OCH$_2$CH$_2$)$_m$OH wherein R is an alkyl group having from about 5 to about 30 carbon atoms, Ph is phenyl and m is an integer of from about 5 to about 50, or a surfactant having the formula R$_1$(R$_2$O)$_n$SO$_3$X wherein R$_1$ is an alkyl group having from about 5 to about 20 carbon atoms, R$_2$ is the group —CH$_2$—CH$_2$—, n is an integer from about 10 to about 40 and X is a cation.

68. The method of claim 63 wherein the rubber latex stabilizer is a surfactant having the formula H(CH$_2$)$_{12\text{-}15}$(CH$_2$CH$_2$O)$_{15}$SO$_3$Na.

69. The method of claim 63 wherein the rubber latex stabilizer is present in the composition in an amount in the range of from about 3% to about 6% by weight of rubber latex therein.

70. The method of claim 63 wherein the gas comprises at least one from the following group: air and nitrogen.

71. The method of claim 63 wherein the gas is nitrogen.

72. The method of claim 63 wherein the gas is present in the composition in an amount in the range of from about 5% to about 35% by volume of the non-foamed composition.

73. The method of claim 63 wherein the mixture of foaming and foam stabilizing surfactants is a mixture of an ethoxylated alcohol ether sulfate surfactant, an alkyl or alkene amidopropyl betaine surfactant, and an alkyl or alkene amidopropyl dimethyl amine oxide surfactant.

74. The method of claim 63 wherein the mixture of foaming and foam stabilizing surfactants is present in the composition in an amount in the range of from about 4% to about 10% by volume of rubber latex therein.

75. The method of claim 63 wherein the composition further comprises a viscosity increasing agent.

76. The method of claim 75 wherein the viscosity increasing agent comprises at least one from the following group: bentonite, hydroxyethyl cellulose, sodium silicate, and guar gum.

77. The method of claim 75 wherein the viscosity increasing agent is bentonite.

78. The method of claim 75 wherein the viscosity increasing agent is present in the composition in an amount in the range of from about 5% to about 10% by weight of cement therein.

79. The method of claim 63 wherein the composition further comprises a density adjusting weighting material.

80. The method of claim 79 wherein the density adjusting weighting material comprises at least one from the following group: a particulate iron oxide, barium sulfate, galena, and manganese oxide.

81. The method of claim 79 wherein the density adjusting weighting material is particulate iron oxide.

82. The method of claim 79 wherein the density adjusting weighting material is present in the composition in an amount in the range of from about 1% to about 250% by weight of cement therein.

83. The method of claim 63 wherein the composition further comprises a cement set retarder.

84. The method of claim 83 wherein the set retarder comprises at least one from the following group: citric acid, sodium gluconate, gluconic acid, sodium citrate, and a sugar.

85. The method of claim 83 wherein the set retarder is citric acid.

86. The method of claim 83 wherein the set retarder is present in the composition in an amount in the range of from about 0.2% to about 4% by weight of cement therein.

87. A foamable and compressible composition for sealing an expandable pipe or pipe string in a well bore comprising hydraulic cement, rubber latex, and a latex stabilizer.

88. The composition of claim 87 wherein the composition is foamed.

89. The composition of claim 87 wherein the composition comprises a gas.

90. The composition of claim 89 wherein the gas comprises at least one from the following group: air and nitrogen.

91. The composition of claim 89 wherein the gas is present in the composition in an amount in the range of from about 5% to about 35% by volume of the non-foamed composition.

92. The composition of claim 87 wherein the hydraulic cement comprises at least one from the following group: a calcium aluminate cement, a Portland cement, and a Portland blast furnace cement.

93. The composition of claim 87 wherein the composition comprises a mixture of foaming and foam stabilizing surfactants.

94. The composition of claim 93 wherein the mixture of foaming and foam stabilizing surfactants is a mixture of an ethoxylated alcohol ether sulfate surfactant, an alkyl or alkene amidopropyl betaine surfactant, and an alkyl or alkene amidopropyl dimethyl amine oxide surfactant.

95. The composition of claim 93 wherein the mixture of foaming and foam stabilizing surfactants is present in the foamed composition in an amount in the range of from about 4% to about 10% by volume of rubber latex therein.

96. The composition of claim 87 wherein the rubber latex comprises at least one from the following group: a styrene/butadiene copolymer latex emulsion, a polychloroprene emulsion, a polyisoprene emulsion, and an acrylonitrilibutadiene.

97. The composition of claim 87 wherein the rubber latex is present in the composition in an amount in the range of from about 80% to about 300% by weight of cement therein.

98. The composition of claim 87 wherein the rubber latex stabilizer comprises a surfactant having the formula R-Ph-O(OCH$_2$CH$_2$)$_m$OH wherein R is an alkyl group having from about 5 to about 30 carbon atoms, Ph is phenyl and m is an integer of from about 5 to about 50, or a surfactant having the formula R$_1$(R$_2$O)$_n$SO$_3$X wherein R$_1$ is an alkyl group having from about 5 to about 20 carbon atoms, R$_2$ is the group —CH$_2$—CH$_2$—, n is an integer from about 10 to about 40 and X is a cation.

99. The composition of claim 87 wherein the rubber latex stabilizer is present in the composition in an amount in the range of from about 3% to about 6% by weight of rubber latex therein.

100. The composition of claim 87 wherein the composition further comprises a viscosity increasing agent.

101. The composition of claim 100 wherein the viscosity increasing agent comprises at least one from the following group: bentonite, hydroxyethyl cellulose, sodium silicate, and guar gum.

102. The composition of claim 100 wherein the viscosity increasing agent is present in the composition in an amount in the range of from about 5% to about 10% by weight of cement therein.

103. The composition of claim 87 wherein the composition further comprises a density adjusting weighting material.

104. The composition of claim 103 wherein the density adjusting weighting material comprises at least one from the following group: a particulate iron oxide, barium sulfate, galena, and manganese oxide.

105. The composition of claim 103 wherein the density adjusting weighting material is present in the composition in an amount in the range of from about 1% to about 250% by weight of cement therein.

106. The composition of claim 87 wherein the composition further comprises a cement set retarder.

107. The composition of claim 106 wherein the set retarder comprises at least one from the following group: citric acid, sodium gluconate, gluconic acid, sodium citrate, and a sugar.

108. The composition of claim 106 wherein the set retarder is present in the composition in an amount in the range of from about 0.2% to about 4% by weight of cement therein.

* * * * *